July 5, 1949.   V. H. CHRISTEN   2,475,543
STORAGE BATTERY FILLER SUPPORT
Filed May 27, 1947
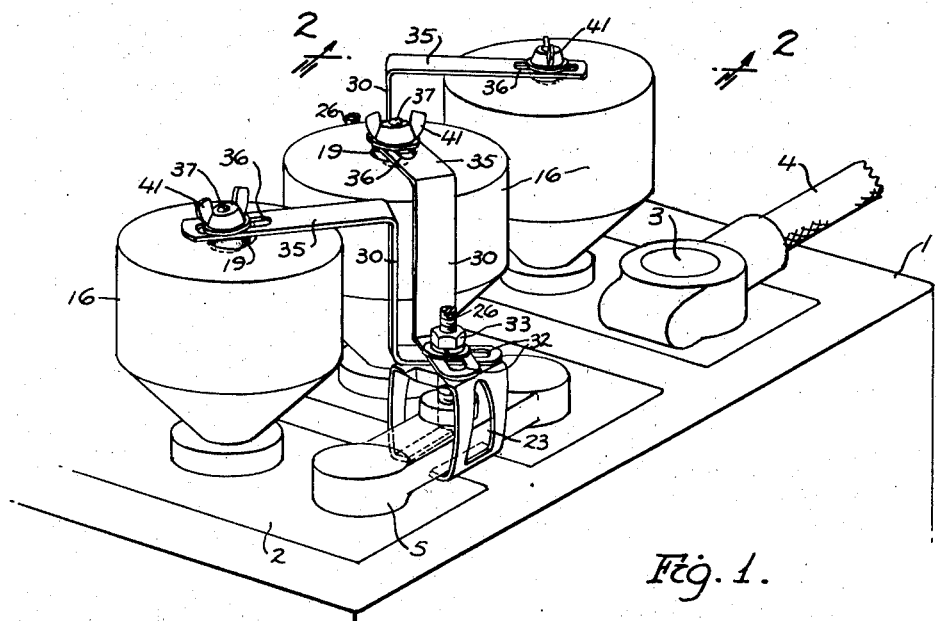
Fig. 1.
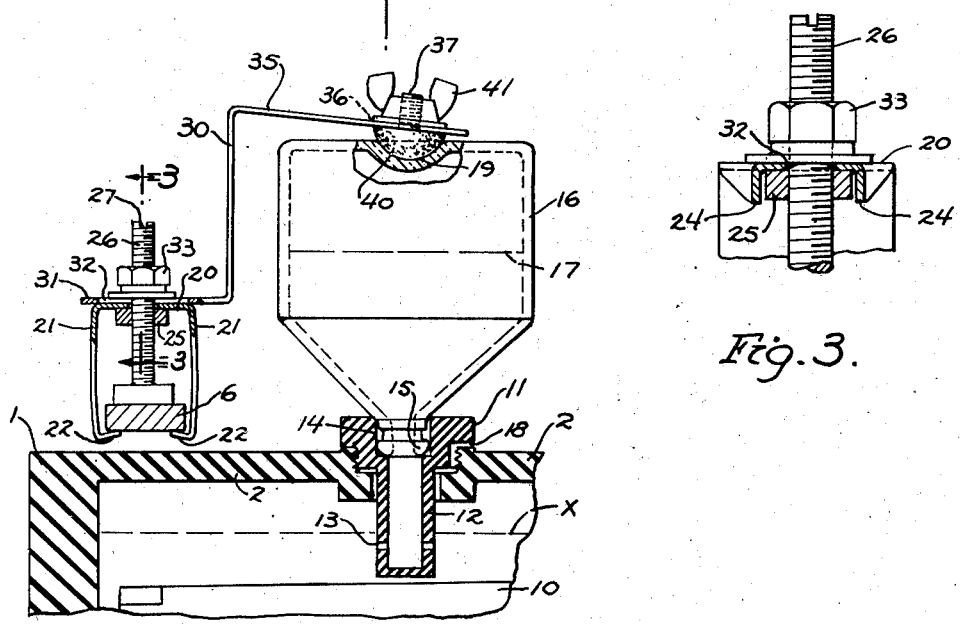
Fig. 2.
Fig. 3.
INVENTOR.
Victor H. Christen
BY
Barnes, Kisselle, Laughlin & Raisch
ATTORNEYS.

Patented July 5, 1949

2,475,543

UNITED STATES PATENT OFFICE 2,475,543

STORAGE BATTERY FILLER SUPPORT

Victor H. Christen, Sierra Madre, Calif.

Application May 27, 1947, Serial No. 750,801

7 Claims. (Cl. 136—162)

This invention relates to mounting means for filler receptacles for electric storage batteries and it has to do particularly with mounting means useful with storage batteries employed in automotive vehicles.

As is well known to those versed in the art, storage batteries must be maintained with a proper level of electrolyte which is accomplished by adding water from time to time and the storage batteries usually embody a plurality of cells, the plates of which are electrically connected by conductor bars mounted above the top cover or closure of the battery box or container. The principal object of the invention is to provide an improved efficient mounting means for containers of water or electrolyte so arranged as to automatically discharge the water or electrolyte into the cells when needed to maintain the proper electrolyte level. The mounting means is, in itself, mounted upon and carried by the conductor bars or cross bars on the battery case so that when assembled the battery, the mounting means and the filler means are all united together as a unit embodying no extra or additional connection to any other structural part.

The invention is disclosed in the accompanying drawings:

Fig. 1 is a perspective view showing a standard form of battery with the mounting means thereon for holding the receptacles for the water or electrolyte.

Fig. 2 is a slightly enlarged cross sectional view taken on line 2—2 of Fig. 1.

Fig. 3 is a slightly enlarged sectional view taken on line 3—3 of Fig. 2.

The battery case is generally illustrated at 1 having a top wall 2. The battery shown is a standard form of battery having three cells. One post 3 is shown for connection to a conductor 4 while the three cells are connected by two cross bars or conductors 5 and 6. The conductor 5 is shown in Fig. 1 while the conductor 6 is on the opposite side and is visible in Fig. 2.

In each cell the electrolyte is maintained at a suitable level, such as the level $x$, shown in Fig. 2, the level being normally a suitable distance above the battery plates 10. Situated in the filler opening of each cell is a sort of plug member having a head 11 which fits in the opening and a depending well 12 provided with one or more small openings 13. The head is provided with a recess 14 which communicates with the well and is adapted to receive the open head and neck portion 15 of an inverted container or bottle 16 designed to contain the water or electrolyte. The liquid in the containers will hereinafter be referred to as water. The level of the water is indicated at 17, but, of course, this will vary.

The head is provided with a vent passage 18 while the well fits loosely in the filler opening, as shown in Fig. 2, to provide for venting of the cell. Insofar as the feeding of the water into the cell is concerned, which involves the action of the water flowing from the inverted container through the wall 12 and through the ports 13, the structure and disclosure is fully made in my co-pending application Serial No. 611,569, filed August 20, 1945, and is also shown in my co-pending application Serial No. 660,881, filed April 10, 1946, now U. S. Patent No. 2,471,094, and Serial No. 687,669, filed August 1, 1946. Suffice it to say, that the electrolyte level $x$ is maintained by the action of the water passing from the container 16 into the cell through the ports 13.

Preferably, the container has a recess 19 in its bottom and which, in effect, is the top of the container considering the position of the bottle in normal use. There are three of such containers or bottles for use, one for each cell, as shown in Fig 1.

The bracket structure comprises a sheet metal supporting body bent to form an upper supporting part 20 with two downwardly extending legs 21, the ends of which are bent inwardly to provide hooks 22. The legs 21 may be of considerable width as shown in Fig. 1, and may be cut away so as to form apertures 23. The top or bight portion 20 is strengthened by having its edges down turned to form flanges 24 (Fig. 3).

The bracket is applied to a conductor bar, as shown in Fig. 2. This may be done by springing the metal of the bracket to apply the legs 21 over opposite sides of the bar 6 with the hooks 22 catching underneath the bar and lying between the bar and the cover 2. A nut 25 lies between the flanges 24 so that it cannot rotate and threaded in the nut is a screw 26 arranged at its upper end as at 27 for receiving a suitable turning tool. The screw 26 is, of course, retracted when the support is applied to the cross bar. After the support has been properly positioned, the screw 26 is turned so that it is fed downwardly as Fig. 2 is viewed, to engage the cross bar, and by continued turning action, the hooks 21 are urged upwardly so that the cross bar is effectively clamped by the screw and the two hooks.

For supporting each container there is a spring arm. The term spring arm is used in the sense that the metal thereof has elastic tendencies.

Each spring arm has an intermediate portion 30 which extends upwardly and a foot portion 31 which has a slot 32. The foot 31 is designed to seat on the portion 20 of the support with the screw 26 passing through the slot 32 and the foot portion is held clamped in position by a nut 33 applied to the screw 26. From the intermediate part 30 extends an arm portion 35 provided with a slot 36 through which passes a screw 37. The head of this screw is equipped with a suitable enlargement preferably of resilient material such as natural or synthetic rubber, for seating in the recess 19 while applied to the screw is a winged nut 41.

Where one container is to be held by one arm the arrangement is as shown in Fig. 2. The bracket for clamping onto the cross bar is applied to the cross bar as above described and then the foot 31 is clamped in position resting on the bight portion 20 of the bracket. The foot 31 may be adjusted due to the slot 32 to obtain the proper location of the head 40 while resting in the recess 19. Also, the screw 37 may be adjusted for further adjustable movement. As the foot 31 is clamped in position, the spring arm is adjusted as to angularity so that the arm 35 projects over the container to be held thereby. In a battery involving two cells, one clamp or bracket may support two spring arms as shown in Fig. 1 with their foot portions lying one upon another and held by a single nut 33.

When it is desired to remove a container for service, which may be necesary in order to refill the container, the spring arm 35 is merely lifted up by a finger of the operator and the container removed. The reserviced or re-filled container may be easily slipped back into position by merely flexing the arm upwardly placing the neck 15 of the container in the recess 14 of the plug and then releasing the spring arm 35 so that the head 40 of the screw comes to rest in the recess 19.

I claim:

1. A device for holding an inverted container for liquid in a position relative to the filler opening of a cell of an electric storage battery for the maintenance of the level of electrolyte therein, where the battery has a top and connector bar for connecting two cells, said connector bar extending along the top of the battery and spaced therefrom; a bracket having parts for engaging under the connector bar in the space between the connector bar and battery, means associated with the bracket for engaging the top surface of the connector bar to clamp the bracket to the connector bar, an arm comprising spring metal, means for mounting the arm to the bracket, said arm having an extending portion for projecting over the inverted container and for yieldingly engaging the same with downward pressure.

2. A device for holding an inverted container for liquid in a position relative to the filler opening of a cell of an electric storage battery for the maintenance of the level of electrolyte therein, where the battery has a top and connector bar for connecting two cells, said connector bar extending along the top of the battery and spaced therefrom; a bracket having a pair of arms, each arm having a hook portion on its end for engaging under the connector bar, said bracket having a portion connecting the arms in a position spaced above the connector bar, means associated with the bracket for engaging the top of the connector bar whereby the bracket is clamped thereto, and means detachably secured to the bracket having an extending part adapted to overlie the inverted container and to engage the same with downward pressure.

3. A device for holding an inverted container for liquid in a position relative to the filler opening of a cell of an electric storage battery for the maintenance of the level of electrolyte therein, where the battery has a top and connector bar for connecting two cells, said connector bar extending along the top of the battery and spaced therefrom; a bracket of formed sheet metal having a bight portion and two legs extending therefrom, said legs each having a hook portion on its lower end for engaging under the connector bar with the bight portion spaced above the connector bar, a screw passing through the bight portion in threaded relationship for engaging the top of the connector bar to clamp the bracket thereto, an arm member having a portion adapted for attachment to the bight portion of the bracket and having a part projecting so as to overlie the inverted container, said arm comprising spring metal for engaging the inverted container yieldably with downward pressure.

4. A device for holding an inverted container for liquid in a position relative to the filler opening of a cell of an electric storage battery for the maintenance of the level of electrolyte therein, where the battery has a top and connector bar for connecting two cells, said connector bar extending along the top of the battery and spaced therefrom; a bracket formed of sheet metal fashioned to provide a substantially flat bight portion with two legs projecting therefrom, each leg having a hook portion on its end for engaging under the connector bar in which position the bight portion is above the connector bar, said bight portion having flange like parts arranged to engage a nut, a screw passing through the nut and adapted to engage the top of the connector bar to clamp the bracket thereto, and a projecting arm comprising spring metal detachably secured to the bight portion and having a part projecting into a position overlying the inverted container for engaging the same with downward pressure.

5. A device for holding an inverted container for liquid in a position relative to the filler opening of a cell of an electric storage battery for the maintenance of the level of electrolyte therein, where the battery has a top and connector bar for connecting two cells, said connector bar extending along the top of the battery and spaced therefrom; a bracket formed of sheet metal fashioned to provide a substantially flat bight portion with two legs projecting therefrom, each leg having a hook portion on its end for engaging under the connector bar in which position the bight portion is above the connector bar, said bight portion having flange like parts arranged to engage a nut, a screw passing through the nut and adapted to engage the top of the connector bar to clamp the bracket thereto, a holding member comprised of spring metal having an end portion adapted to seat upon the bight portion of the bracket and to be secured thereto, said holding arm having an intermediate upwardly extending portion and having an end portion projecting into a position overlying the inverted container for yieldably engaging the container with downward pressure.

6. A device for holding an inverted container for liquid in a position relative to the filler opening of a cell of an electric storage battery for the maintenance of the level of electrolyte therein, where the battery has a top and connector bar for connecting two cells, said connector bar extending along the top of the battery and spaced therefrom; a bracket, including means for engaging the connector bar on its underside in the space between the connector bar and the top of the battery, and means for engaging the top of the connector bar for clamping the bracket thereto, said bracket having a substantially flat upper portion, a holding member of spring metal having an end portion for resting upon the flat upper portion of the bracket, means for securing the said portion of the holding member to the bracket, said holding member having an intermediate upwardly extending part and having an arm projecting from the intermediate part into position overlying the inverted container for engaging the same yieldably with downward pressure.

7. A device for holding an inverted container for liquid in a position relative to the filler opening of a cell of an electric storage battery for the maintenance of the level of electrolyte therein, where the battery has a top and connector bar for connecting two cells, said connector bar extending along the top of the battery and spaced therefrom; a bracket having parts for engaging under the connector bar in the space between the connector bar and the battery, clamping means associated with the bracket for engaging another surface of the connector bar to clamp the bracket to the connector bar, an arm comprising spring metal, means for mounting the arm to the bracket, said arm having an extending portion for projecting over the inverted container and for yieldably engaging the same with downward pressure.

VICTOR H. CHRISTEN.

REFERENCES CITED

The following references are of record in the file of this patent:

UNITED STATES PATENTS

| Number | Name | Date |
|---|---|---|
| 1,361,437 | Blau | Dec. 7, 1920 |
| 2,139,476 | Townsend | Dec. 6, 1938 |

FOREIGN PATENTS

| Number | Country | Date |
|---|---|---|
| 551,867 | Great Britain | Mar. 12, 1943 |